Nov. 11, 1941.  C. H. FREDERIC  2,262,441
POULTRY NEST
Filed Jan. 8, 1940  2 Sheets-Sheet 1
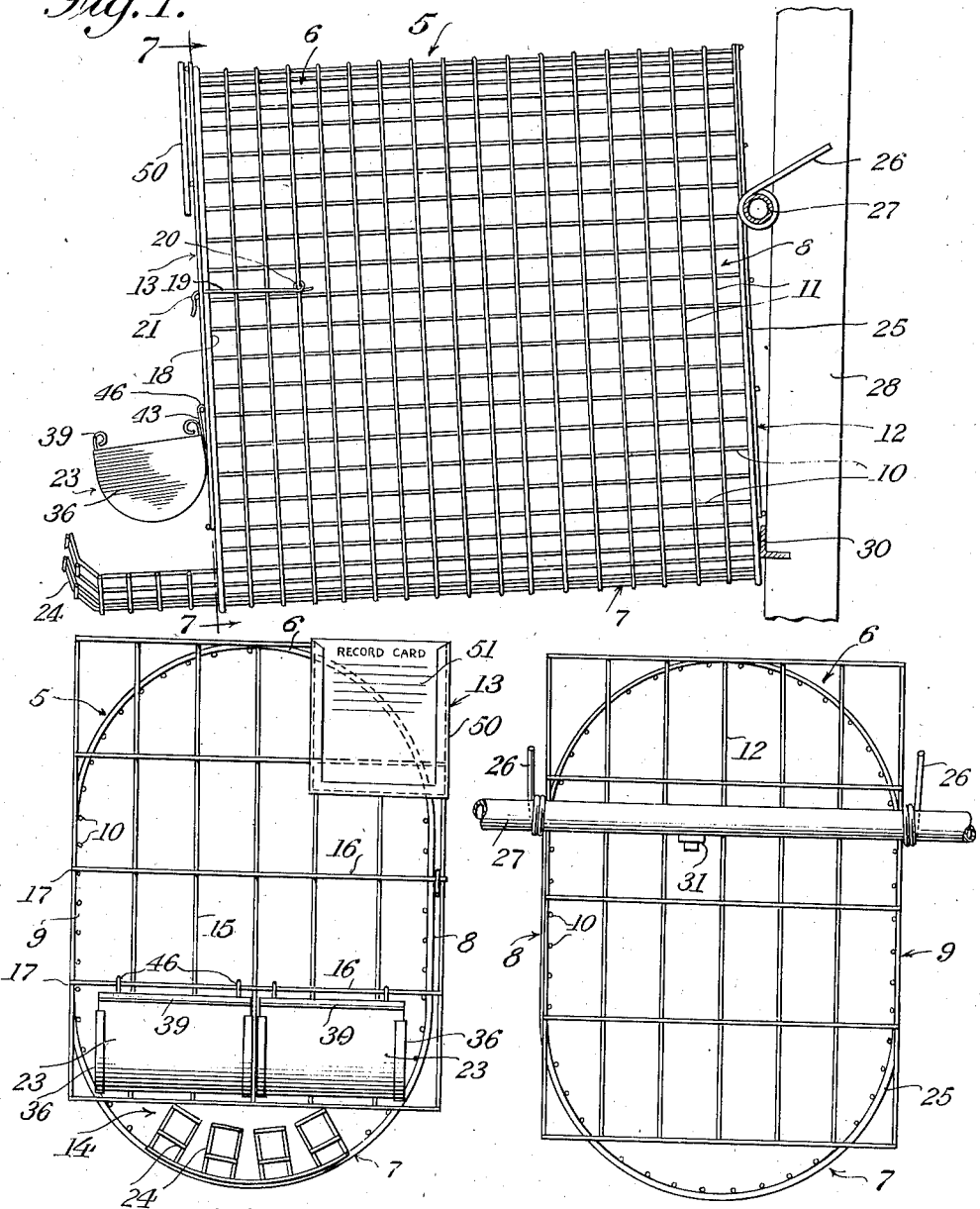

Nov. 11, 1941.     C. H. FREDERIC     2,262,441
POULTRY NEST
Filed Jan. 8, 1940     2 Sheets-Sheet 2
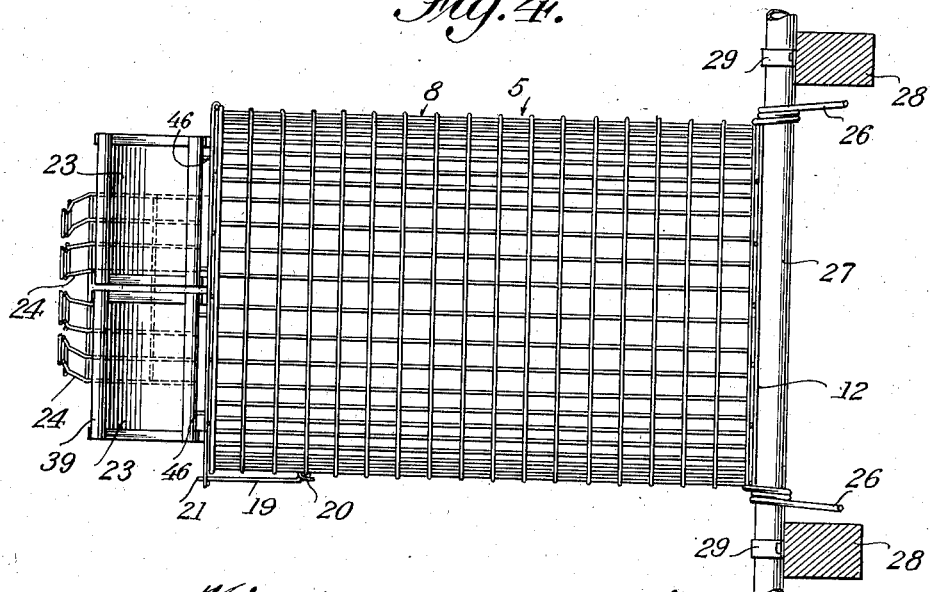
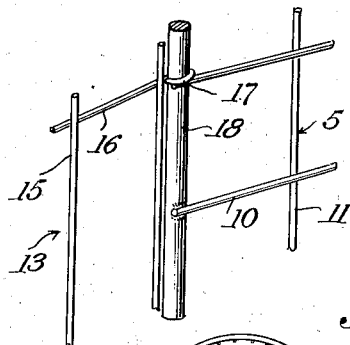
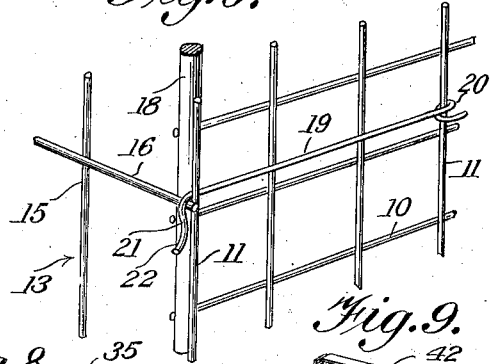
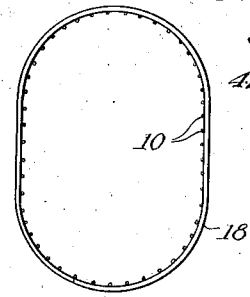
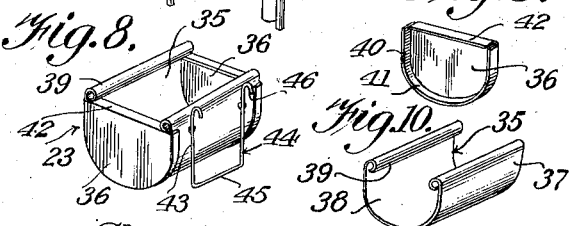
Charles H. Frederic
INVENTOR
BY Victor J. Evans & Co.
ATTORNEYS Patented Nov. 11, 1941

2,262,441

UNITED STATES PATENT OFFICE 2,262,441

POULTRY NEST

Charles H. Frederic, Los Angeles, Calif.

Application January 8, 1940, Serial No. 312,970

1 Claim. (Cl. 119—48)

My invention relates to poultry devices and more especially to individual chicken cages or laying nests.

One of the principal objects of my invention is to provide a cage or nest so constructed and arranged whereby the same can be readily attached to a support, for instance a water pipe, and in a manner to assure the rolling of the eggs when laid without delay so that the eggs can be collected with ease and dispatch.

Another object of my invention is to provide a cage of the above described character which is simple in construction, durable in use, efficient in operation and economical in manufacture.

Other objects and advantages will be apparent from the following description, appended claim and annexed drawings.

Referring to the drawings wherein like reference characters designate like parts throughout the several views:

Figure 1 is a side elevation of my invention.

Figure 2 is a front elevation thereof.

Figure 3 is a rear elevation of my novel form of cage and illustrating the means of attaching the same to a water pipe for supporting said cage.

Figure 4 is a top plan view of my invention.

Figure 5 is a fragmentary perspective view of a side portion of the cage and illustrating the manner of hinging the door thereto.

Figure 6 is a fragmentary perspective view of a portion of the opposite side of the cage and illustrating the latch means for securing the door in closed position.

Figure 7 is a diagrammatic sectional view taken on the line 7—7 of Figure 1 and illustrating the general contour of the cage and with the feed troughs, door and rear wall removed therefrom.

Figure 8 is a perspective view of one of the feed cups or troughs.

Figure 9 is a detail perspective view of the end wall of a feed cup.

Figure 10 is a perspective view of the body section of a feed cup.

In practicing my invention, as illustrated in the drawings, I provide a cage 5 of an elongated configuration in cross section and formed with semi-circular top and bottom walls 6 and 7 respectively integrally connected to spaced vertically disposed side walls 8 and 9. The walls of said cage are of a latticed construction and comprise a plurality of longitudinally extending spaced wires 10, the latter being connected together in spaced relation by a plurality of spaced transversely disposed endless wires 11 and which construction, as heretofore stated, is of an elongated configuration as illustrated in Figure 7 of the drawings.

The rear end of the cage 5 is closed by a latticed rear wall 12 secured to said cage in any convenient manner, for instance by welding or the like. The front of said cage is normally closed by a rectangular-shaped door 13 of a latticed construction, the upper end of said door being disposed in a plane coincident with the uppermost part of the upper wall 6. The lower end of the door extends an appreciable distance below the upper ends of the lower wall 7 and terminates an appreciable distance superjacent the lowermost portion of said lower wall 7 to provide therebetween an egg discharge opening 14 as clearly illustrated in Figure 2 of the drawings.

The door 13 comprises a plurality of spaced connected vertical and horizontally disposed wires 15 and 16 with a pair of said wires 16, adjacent the lowermost horizontally disposed wire, formed with looped sections 17 on the ends thereof encircling one of a pair of vertically disposed frame members 18 connected to the front ends of the side walls 8 and 9 as illustrated in Figure 5 of the drawings. The looped sections 17 each overlie an end of one of the horizontally disposed wires 10 whereby to support the door thereon and permit said door to be swung from closed to open position and vice versa.

In order to maintain the door 13 in closed position I provide a latch device comprising a horizontally disposed length of wire 19 having a rear end section 20 looped about one of the vertically disposed wires 11 of the side wall 9 and with said length of wire being disposed outwardly of a pair of adjacent vertically disposed wires 11 next to the frontmost length of wire 11. The front end of the wire 19 is disposed inwardly of the frontmost length of wire 11 and is fashioned with a downwardly arcuate-shaped portion 21 terminating in a forwardly extending end 22 whereby said front end of the wire 19 may be snapped over the adjacent end of one of the horizontally disposed wires 16 forming part of the door 13 to secure said door in latched position against the front of the cage 5. Suspended from one of the horizontally disposed wires 16 of the door 13 and subjacent the latch device 19a is a pair of feed troughs or cups 23 whereby a chicken within the cage may have access thereto between the wires 15 and 16.

A number of pairs of lowermost horizontally disposed wires 10 forming a part of the bottom wall 7 extend an appreciable distance forwardly of the door 13 and terminate in upwardly and outwardly extending sections having ends integrally connected together to define a plurality of fingers 24 for engaging eggs discharged from within the cage through the opening 14 whereby to maintain said eggs on said forwardly extending portions of the wires 10 for manual removal therefrom.

Fixed to the rear end of the cage 5 and surrounding the sides and bottom walls 8, 9 and 7 is a U-shaped member 25 secured to the rear end of the cage in any convenient manner, for instance by welding or the like, and which member terminates at its upper end in rearwardly disposed free end sections 26, the latter being wrapped around or encircling a transversely extending water pipe 27 whereby said cage is connected to said water pipe in suspended relation.

The water pipe is supported against the front faces of vertically disposed supports 28 and secured thereto by means of brackets 29. Subjacent the water pipe 27, the front faces of the supports 28 have fixed thereto vertically disposed sections of a transversely extending angle iron 30. The lower or horizontal section of said angle iron 30 is disposed inwardly of the front face of the supports 28 whereby, when said cage 5 is connected to the water pipe 27 as heretofore described, the lower bottom portion of the cage will engage the vertical section of the angle iron and dispose said cage in a forward and downward plane whereby eggs laid by a chicken within the cage will roll towards the front end thereof and be discharged through the opening 14 and in engagement with the fingers 24.

It is to be understood that while I have illustrated and described my invention in connection with a single cage, a plurality of my novel form of cages may be suspended from the pipe 27 to form a battery of said cages. The water pipe 27 is provided with a valve 31, such as the valve disclosed in United States Patent No. 1,903,767, dated April 18, 1933, to H. C. Karst, operable by a chicken within the cage so that the chicken may receive water from said pipe and inasmuch as said valve forms no part of the present invention per se, a detailed description of the valve is not believed warranted.

As illustrated in Figures 8 to 10 of the drawings, the feed troughs or cups 23 are of an elongated configuration and comprise body and end sections 35 and 36 respectively. The body section 35 is of a substantially U-shaped configuration in cross section having side walls 37 integrally connected together in spaced relation by means of an arcuate-shaped bottom wall 38. The upper ends of the side walls 37 are fashioned with inwardly disposed rolled edges 39 for a purpose hereinafter more fully set forth. The end sections 36 constitute end walls and are fashioned at their edges with inwardly disposed side flanges 40 integrally connected together by an arcuate-shaped bottom flange 41 and also with horizontally disposed top flanges 42. The side and bottom flanges 40 and 41 outwardly embrace the side and bottom walls 37 and 38 of the body section 35 in overlying relation with the marginal edges thereof.

The top horizontally disposed flanges 42 of the end walls 36 extend within the cup and are disposed subjacent the ends of the rolled edges 39 and in engagement therewith as clearly illustrated in Figure 8 of the drawings. One of the side walls 37 has spot welded on the outer face thereof and subjacent its rolled edge 39 upper ends of vertically disposed arms 43 of a substantially U-shaped member 44. The lower ends of the arms 43 are integrally connected together by a transverse portion 45. The upper ends of the arms 43 are provided with hooks 46 for engagement over one of the horizontally disposed wires 16 of the door 13 whereby to suspend the feed cups from said door. The lower ends of the arms 43 may be bent outwardly with respect to the cup to dispose the cup at a desired angle with respect to the door to facilitate feeding of the chicken within the cage.

The rolled edges 39 of the cup serve to preclude injury to the chicken and also prevent loss of feed for the reason that there is substantially no waste resulting from the chicken "billing" out the feed from the cup, it being understood that in "billing" the chicken throws the feed out of the cup with its bill in ordinary cups by bringing its bill upwardly against the inner face of one of the side walls of the cup. Therefore, it can be readily understood that the rolled inwardly disposed edges serve as a stop or guard. Furthermore, the cross sectional contour of my cage as clearly illustrated in Figure 7 of the drawings effects an economy in manufacture for the reason that substantially 25% less wire mesh is used to construct the same. Also, the bottom or floor of the cage, due to said contour, is of a more rigid construction and when said floor or bottom is inclined with respect to horizontality it provides a positive means for discharging the egg without the cage as heretofore described.

As illustrated in Figures 1 and 2 of the drawings, a card holder 50 is secured to the door, for instance by spot welding, and said card holder is of a sheet metal construction having side and bottom outwardly disposed spaced flanges for retaining a record card 51 in connected relation with said holder whereby an egg record or the like may be kept of the chicken contained in the cage.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction illustrated and described, which constitutes a preferred embodiment thereof illustrative of the principles of operation but that it comprehends all construction within the scope of the appended claim.

What I claim is:

In a poultry cage, a body of tubular formation having a plurality of spaced rigid wires secured to and extending longitudinally within a plurality of endless wires disposed transversely about the body in spaced relation, the said body being vertically elongated in cross section and having semicircular outwardly bulging top and bottom walls merging into straight side walls, a plurality of the longitudinal wires of the semicircular bottom wall being extended forwardly of the front end of the body and bent upwardly at the forward ends to form an egg receiving projection, a plurality of arcuate cross wires connected to the said extended bottom wires, a wall secured to and covering the rear end of the body, a relatively heavy continuous wire secured about the front end of the body, a door mounted to cover the major portion of the front end of the body and to provide a discharge opening therein leading onto the egg receiving projection, loops hingedly connecting one side of the door to a side portion of the heavy continuous wire, a latch on the body for releasably holding the said door in closed position, and an approximately U-shaped member secured to the sides and bottom at the rear end of the body having its upper end portions coiled to embrace a support member for supporting the body in such position that the bottom is inclined to roll eggs therealong onto the forwardly projecting portion.

CHARLES H. FREDERIC.